(12) United States Patent
Gohara et al.

(10) Patent No.: US 6,488,899 B1
(45) Date of Patent: *Dec. 3, 2002

(54) LOW PRESSURE DROP INLET DESIGN TO PROMOTE GOOD GAS FLOW PATTERNS IN HIGH VELOCITY ABSORBERS

(75) Inventors: Wadie F. Gohara, Barberton, OH (US); William H. Hall, Alliance, OH (US); Edward J. Piaskowski, Massillon, OH (US)

(73) Assignee: The Babcock & Wilcox Company, New Orleans, LA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,136

(22) Filed: Feb. 11, 1998

(51) Int. Cl.[7] ............................... B01J 8/00; B01F 3/04
(52) U.S. Cl. ........................ 422/171; 422/172; 422/176; 261/109

(58) Field of Search ................................. 422/168–172, 422/176; 423/210, 240 R, 235, 243.01, 243.08; 261/17, 109, DIG. 9

(56) References Cited

U.S. PATENT DOCUMENTS

| 5,281,402 A | 1/1994 | Gohara et al. ............... 423/210 |
| 5,403,523 A | 4/1995 | Strock et al. ................ 261/111 |
| 5,558,818 A | 9/1996 | Gohara et al. ................ 261/17 |
| 5,648,022 A | 7/1997 | Gohara et al. ................ 261/17 |

*Primary Examiner*—Hien Tran
(74) *Attorney, Agent, or Firm*—Eric Marich

(57) ABSTRACT

A high velocity absorber has a lower larger diameter tank section for receiving a slurry at a liquid level in the. tank section, an upper smaller diameter absorber section where liquid scrubbing agent is mingled with flue gas from which impurities are to be absorbed, and a low pressure drop inlet assembly having a transition structure between the tank section and the absorber section for closing a gas flow path and a liquid flow path between the tank section and the absorber section. An inlet housing is connected to and communicates with the transition structure for inlet of flue gas into the transition structure between the tank section and the absorber section.

7 Claims, 6 Drawing Sheets

LOW PRESSURE DROP INLET DESIGN TO PROMOTE GOOD GAS FLOW PATTERNS IN HIGH VELOCITY ABSORBERS

BACKGROUND OF THE INVENTION

1. Field of the Invention

The present invention relates, in general, to flue gas desulfurization absorbers, and in particular, to a new and useful absorber arrangement having a gas inlet at the transition between a lower, large diameter tank section which contains a liquid slurry level, and an upper small diameter absorber section.

2. Description of the Related Art

Commercialization and development of high velocity absorbers is pursued because of the economic advantages they offer such as lower capital cost, less real estate requirements, shorter more compact absorbers, and improved $SO_2$ removal efficiency. On the other hand, high velocity has some disadvantages such as increased resistance to gas flow and increased sensitivity of the system to changes in the hydraulic behavior of the gas and liquid phases. Physical model studies show that the gas velocity through the inlet of the absorber affects gas distribution in the absorber and affects the performance and behavior of the absorption zone and mist eliminator.

Regardless of the physical shape of the absorber, the resistance to gas flow is categorized as either useful resistance or parasitic resistance. Useful resistance is converted directly and entirely into scrubbing efficiency and participates in gas redistribution such as the absorption zone pressure drop. Parasitic resistance is expended to conduct the gas through the absorber confines without effective participation in the chemical process. The inlet and outlet resistances are good examples of this type of resistance. The use of turning vanes or other gas distribution devices is a simple solution to outlet resistance. However, the inlet pressure drop is not easy to reduce because it is a combination of the gas and the scrubbing liquid interaction throughout the absorber.

Traditional absorber inlets vary in shape and size but the shape of the inlets is basically the same. FIG. 1 shows the commonly offered inlet design (without protective awning). In this design, the liquid flowing off the absorber walls 12 or sprayed by nearby spray headers, falls into the inlet 14 and forms a solid growth at the wet/dry interface causing maldistribution and higher resistance. To overcome this problem and as shown in FIG. 2, protective intrusive awnings 16 were placed on top of the inlet 14 (see U.S. Pat. No. 5,281,402). The awning diverted the contact point (between the hot gas and the liquid curtain flow) from the vicinity of the inlet to the center of the absorber. Solids deposition is averted because gas humidification occurs in an area where there is minimum contact between the hot gas and the inlet flue surfaces. This design has been proven functional at the traditional gas velocities when the spray zone resistance is large enough to affect even distribution before the gas reached the mist eliminator further up in wall 12. As the gas velocity increases, however, the curtain resistance adds significantly to the overall system parasitic pressure drop and distortions to gas flow pattern becomes more critical.

While the liquid curtain is needed to humidify and help gas redistribution, it has two significant drawbacks. It significantly increases the inlet pressure drop compared to an inlet without an awning, and it distorts the flow pattern as the gas rises through the absorber.

In a new generation of high velocity absorbers, gas velocity is set between about 15 to about 20 feet per second. Minor distortion in the gas flow pattern results in localized high gas velocities approaching or exceeding the critical velocity of the mist eliminator and may result in functional failure of the mist elimination device.

To overcome the negative effects of high gas velocity in the inlet, one could increase the inlet's flow area and limit the gas velocity to the conventional 3,000 feet per minute. This solution, while simple and practical, will result in a larger inlet aspect ratio (height to width) and increases the absorber height and inlet resistance. An increase in absorber height minimizes the advantages gained by high velocity scrubbing. Other options include advanced low pressure drop gas inlets for the new generation of high velocity absorbers, or the use of available means within the system to redistribute the gas flow without significant increase in inlet resistance.

The current industry inlet design uses the installation of the protective awning 16 on top of the inlet 14 to deflect the slurry away from the hot flue gas flow and prevents the deposition of solids at the wet/dry interface. However, at high absorber gas velocity, obstruction of the gas path by the high density liquid curtain deflects the gas to the sides causing an increase in gas velocity and possible distortion.

Model studies and operating experience teaches that at an absorber velocity between about 1 to about 12.5 feet per second, the current inlet designs provide good gas distribution across the absorber at or below about 3,000 feet per minute inlet velocity. The good gas distribution is provided partially by the resistance of the liquid curtain, falling off the awning to the entering gas. The primary function of the awning is to provide protection against inlet wetness and solids deposition and to provide ample resistance to slow down the entering gas, thus allowing the gas adequate time to redistribute itself across the absorber flow area. At an absorber gas velocity below 12.5 feet per second reasonable gas distortion in the absorber will not approach the critical failure velocity of the mist eliminator.

As the gas velocity increases above about 12.5 feet per second and approaches about 20 feet per second or more, the resistance of the liquid curtain falling off the awning becomes significant and magnifies the effects of gas flow distortion.

Several attempts were made to reduce the resistance of the awning first by introducing a new generation of non intrusive awnings. In these designs, the awning is removed from the inlet's gas stream and placed above the inlet. See U.S. Pat. No. 5,403,523; 5,558,818 and 5,648,022. Each of these developments contributed to the reduction of the inlet's parasitic pressure drop caused by the intrusion of the original awning into the gas flow path. These designs, however, added 3 feet to the height of the absorber and none of them totally eliminated the effect of the heavy density liquid curtain.

These prior efforts were steps in the right direction to reduce the inlet's parasitic resistance, however, in every case the curtain resistance remained the same. Considering that one inch (water) of pressure drop is evaluated at approximately $1 million over the life of the power plant, reduction of the parasitic resistance of the absorber provides a significant competitive edge. Table 1 compares the pressure drop of an inlet with and without awning.

TABLE 1

Comparison of Inlet Pressure Drop
for No Awning and Awning Designs*

| Description | Intrusive Awning | Non-Intrusive Awning | No Awning |
|---|---|---|---|
| Inlet Pressure Drop (Inch Water) | 4.59 | 3.50 | 2.50 |

*Inlet velocity about 3,600 feet per minute, liquid flux about 60 gpm per square feet, absorber velocity about 15 feet per second.

SUMMARY OF THE INVENTION

The present invention provides a combination of an advanced gas inlet with the sought protection against wet/dry zone solids deposits and reduces the liquid curtain to the same density observed in the inlet design without an awning. The new inlet does not promote the formation of thick high density liquid curtains in the gas path, thus reducing the parasitic pressure drop experienced with awning equipped inlets. The new design places the inlet in the transition between the large diameter tank and the small diameter absorption zone.

Successful application of this invention could possibly result in an evaluated cost of about $1,000,000 less than the current designs and over about $2,000,000 in savings over the original intrusive awning design.

The present invention is suitable for absorbers with flared tanks. The inlet is located in the transition between the tank and the absorber section. As a consequence of the location, the top plate of the inlet extends from about 1 to about 10 feet beyond the lower plate. This extension provides a natural protection to the inlet from the backflow of slurry into the hot gas zone. The smaller diameter absorption zone limits the area of falling liquid to the center of the tank leaving an annulus void of the falling slurry available for gas flow. This arrangement eliminates the need for an inlet bustle and utilizes the annulus to provide the gas with a path of low resistance. The falling liquid has an aspirating effect on the entering gas, thus, promoting gas distribution along the perimeter of the transition. The side walls of the inlet follows the contour of the conical transition. Side shields may be provided to protect the inlet from splashing, however, these side shields are expected to be added on a case by case basis. The smooth transition between the tank and the absorption zone provides means to contract the gas gently and evenly into the absorber section.

Accordingly, an object of the present invention is to provide, in an absorber having a lower large diameter tank section for receiving a slurry at a liquid level in the tank section, an upper small diameter absorber section where liquid scrubbing agent is mingled with flue gas from which impurities are to be absorbed, a low pressure inlet assembly comprising a transition structure between the tank section and the absorber section for closing a gas flow path and a liquid flow path between the tank section and the absorber section and an inlet housing connected to and communicating with the transition structure for inlet of flue gas into the transition structure between the tank section and the absorber section.

Another object of the present invention is to provide a low pressure inlet assembly for an absorber tower which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
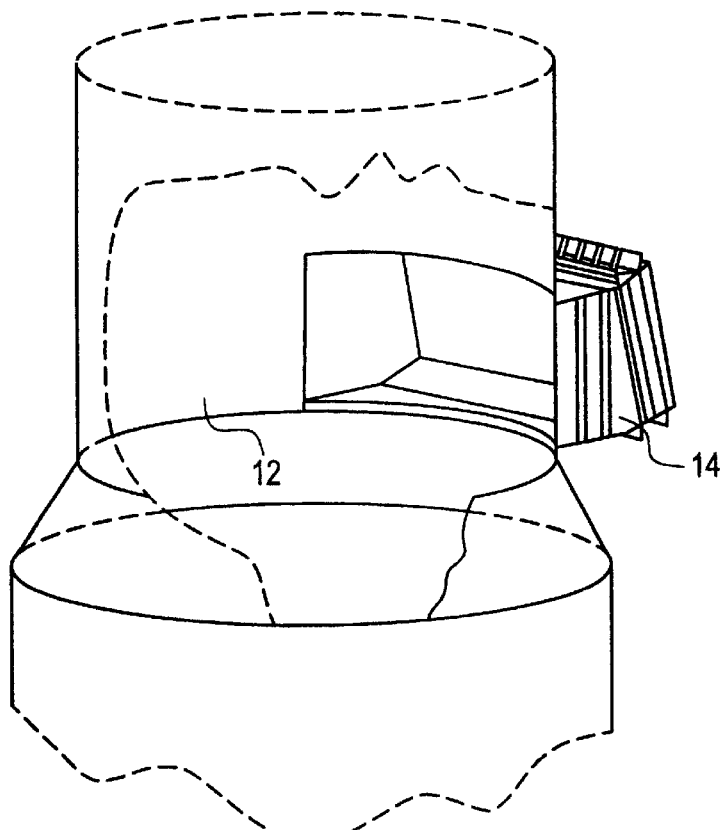
FIG. 1 is a partial schematic illustration of an absorber tower according to the prior art.
Figure 2:
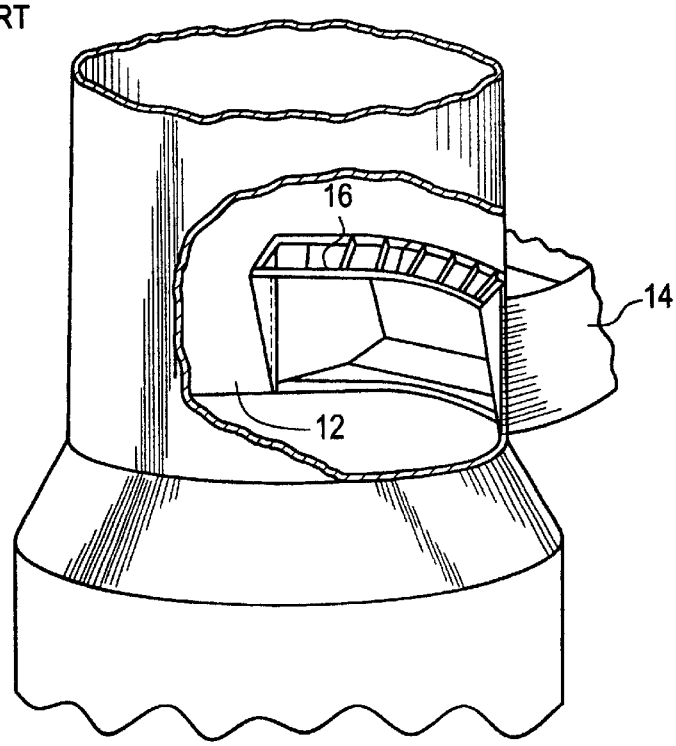
FIG. 2 is a view similar to FIG. 1 of another absorber tower according to the prior art.
Figure 3:
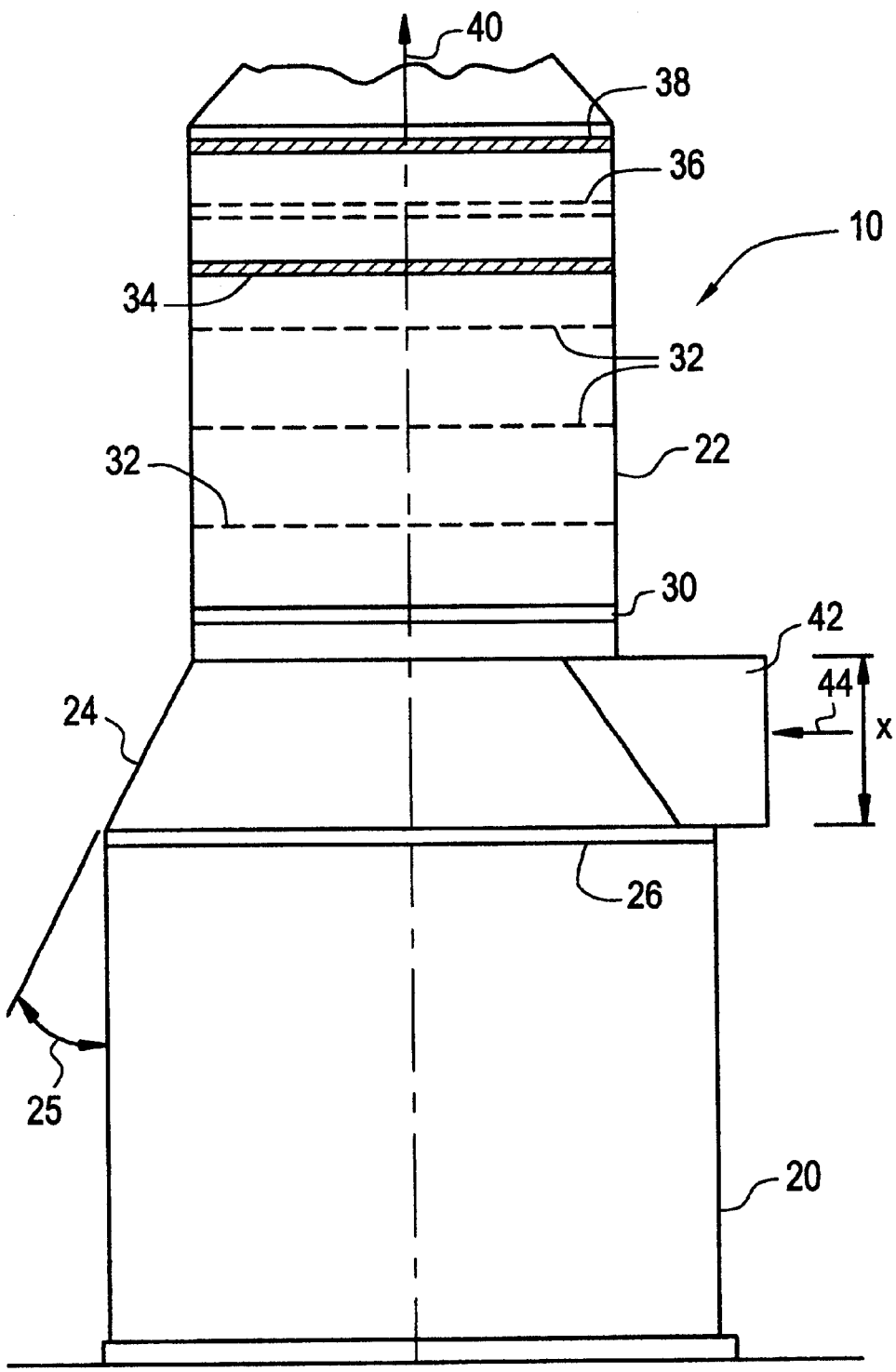
FIG. 3 is a schematic side elevational view, partially in section of an absorber tower according to the present invention.
Figure 4:
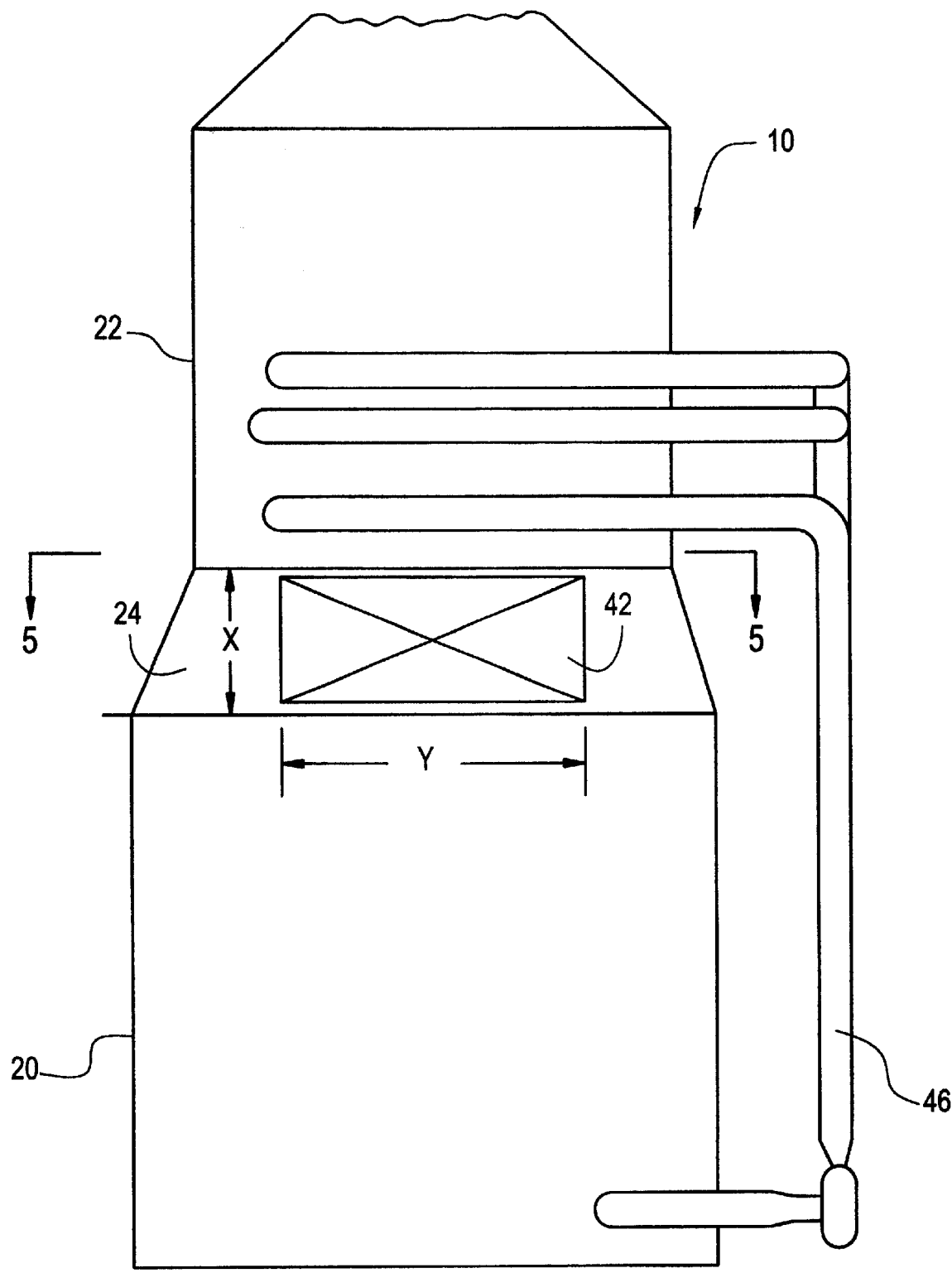
FIG. 4 is an elevational view of the absorber tower of the present invention.

Referring to the drawings in particular, the invention embodied in FIGS. 3 and 4, comprises an absorber tower generally designated 10 having a lower, relatively large diameter tank section 20 connected to an upper, relatively smaller diameter absorber section 22 by a transition structure 24 which forms a liquid tight and gas tight pathway for gases and liquids between tank section 20 and absorber section 22.

Consistent with the prior art, tank section 20 contains a slurry made up of absorber liquid, particles and impurities from the absorption process, rising to a level 26 in tank section 20, below transition structure 24. As with conventional absorbers in particular, gas absorbers for de-sulfurizing flue gas, absorber section 22 contains a perforated plate or tray 30 which helps divide uprising flue gas with downfalling liquid to intimately communicate the two fluids with each other. A plurality, three in the case of FIG. 3, absorber spray headers 32 are spaced at intervals above tray 30 and receive absorbing fluid in the form of some recycled slurry from tank 20 and fresh absorbing liquid such as limestone or lime slurry. A primary mist eliminator 34 extends across the internal volume of absorber 22, above headers 32. An overspray header 36 may be provided above primary mist eliminator 34 and a secondary mist eliminator 38 provided above overspray header 36. Scrubbed gas leaves through an upper gas outlet schematically shown at 40 in FIG. 3.

According to the present invention, flue gas initially enters the absorber tower 10 through an inlet housing 42 as schematically shown at arrow 44. Inlet housing 42 has an opening which communicates with transition structure 24 to receive gas 44 into the tower, and has an aspect ratio of a typical height X to a typical width Y, the height being confined to the height of the transition structure 24 and the width extending partly around the circumference of the transition structure. FIG. 4 illustrates the recirculation conduits 46 which form part of the known recycling structure for the slurry.

Figure 6:
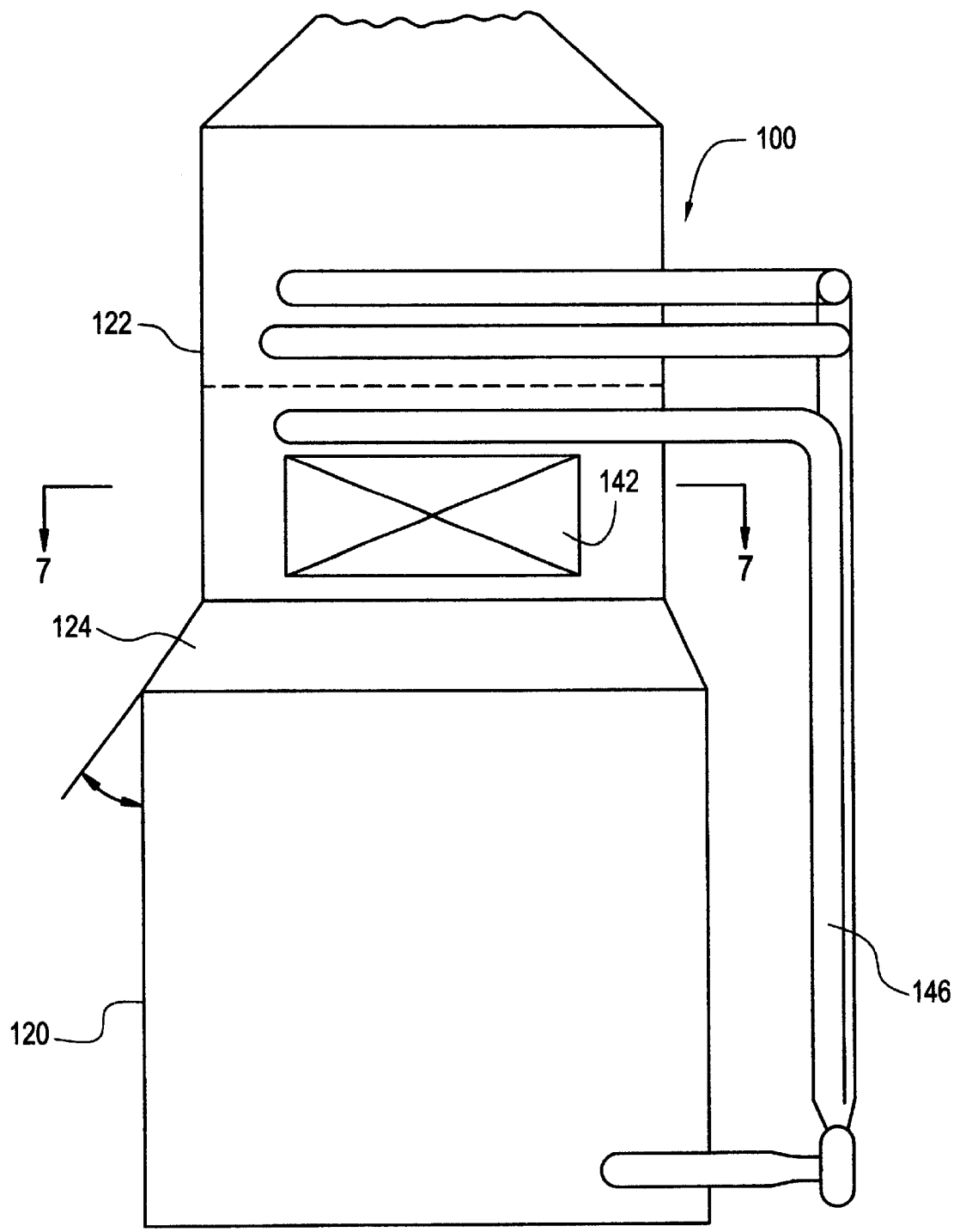
FIG. 6 is a view similar to FIG. 4 of a prior art absorber tower.

For contrast, FIG. 6 illustrates a known absorber tower generally identified as 100, with lower tank 120, upper absorption section 122 and transition structure 124. Recycling structure 146 is also provided for recycling slurry from tank 120. According to the prior art, inlet 142 is connected to and communicates with the upper absorption section 122 and suffers from problems of the prior art noted above.

Figure 5:
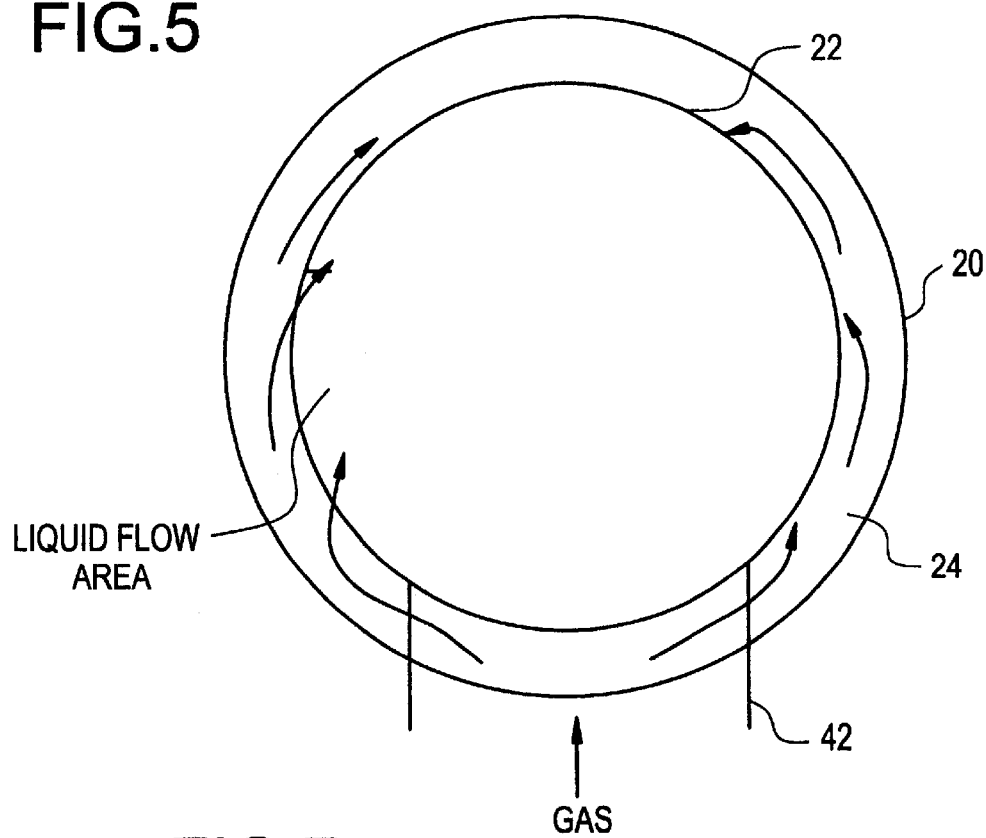
FIG. 5 is a schematic sectional view taken along line 5—5 of FIG. 4.

FIG. 5 illustrates how gas enters through inlet housing 42 in the transition structure 24, spreads easily around the liquid free annular transition area and is more evenly distributed around the absorption section 22. This is primarily because in the transition area in the annular space around the absorption section, very little liquid is present, leaving the gas free to spread quickly and easily around the annulus.

Figure 7:
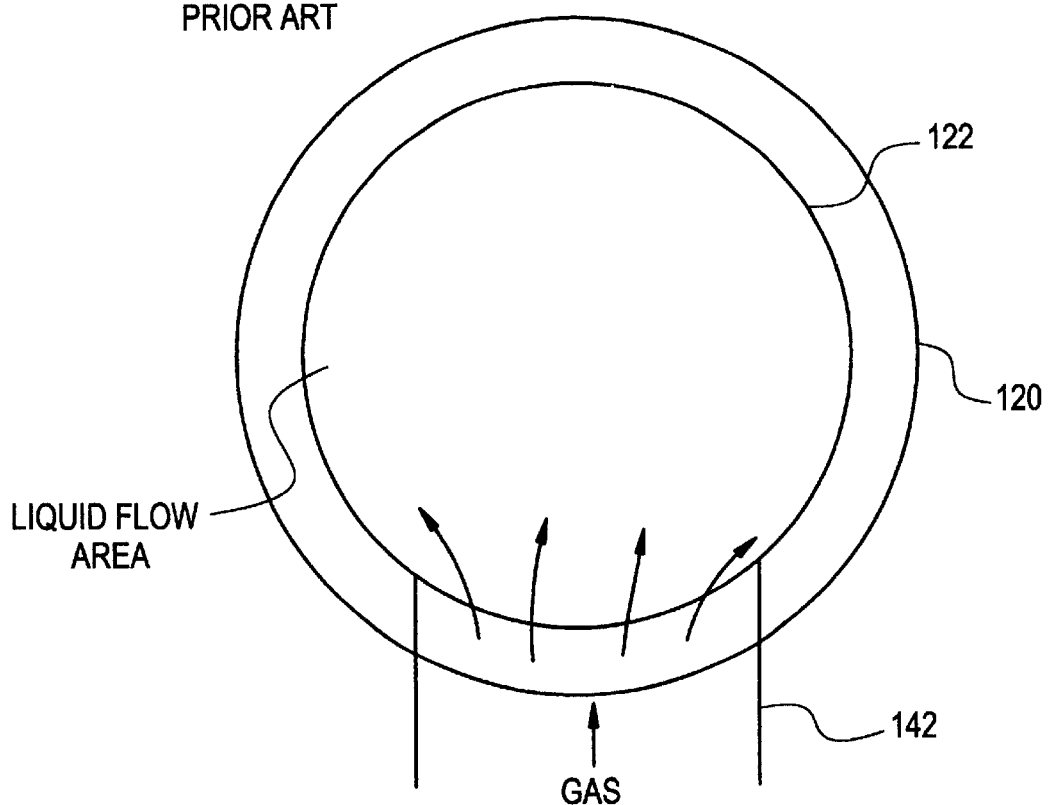
FIG. 7 is a schematic sectional view taken along line 7—7 of FIG. 6.

FIG. 7 is a similar view taken from the structure of FIG. 6, however, illustrating how all of the gas inlet through inlet housing 142, is initially confined to one side of the liquid containing absorption section 142.

The height (X) of the inlet housing 42 determines the height of the transition 24 and the angle 25 at which the transition is executed. Transition angles between about 15 to about 90 degrees are possible to use. Steeper angles (less than about 15 degrees) may be used. The width (Y) of the inlet housing 42 is usually limited to a sector with an about 90 degree apex angle for structural purposes. Larger inlet width spanning the entire diameter of the absorber could also be used without or with an intermediate load bearing sections of the absorber shell to divide the gas inlet into two or more sections as required by mechanical design.

The absence of an awning plate protruding into the gas/liquid stream reduces the density of the liquid curtain to a thickness comparable to the no awning arrangement, thus reducing the liquid curtain parasitic pressure drop to the level of the no awning designs. In addition, the liquid free annulus formed along the perimeter of the tank allows the gas to spread around at a lower velocity. The sudden reduction in gas velocity will result in recovery of some of the velocity pressure expended in the previous designs. More pressure recovery is expected as the gas is cooled and humidified. However, this gain is experienced also in the current inlet designs.

The following advantages are realized from the application of the new inlet arrangement:

1. Locating the inlet in the transition section reduces the pressure drop of the inlet by an amount equal to the liquid curtain pressure drop. Additional pressure drop reduction may be realized as a result of lower gas velocity in the annulus and better gas distribution.
2. Better gas distribution in the absorption zone is needed to maximize the liquid gas contact and optimize the removal efficiency of the absorber.
3. Minimum height reduction from the overall absorber height of about 2.5 to about 3 feet. This height is added to accommodate the present awning design.
4. The design is simple and eliminates the need for the external bustle required by the previous high velocity inlet design.
5. Lowering the spray headers by about 2 to about 3 feet results in a lower pump power and improves the economy of the absorber design.
6. Reduction in the alloy material used to construct the awning and false bottom.
7. Eliminates or uses smaller side shields will further reduce the use of high alloy material and promote lower gas velocity in the annulus.
8. Elimination of the bustle is another source of reducing material requirements and the overall absorber weight.
9. The annulus is provided to distribute the gas along the perimeter of the tank and is expected to provide better gas distribution at the bottom of the absorption zone.
10. The aspiration created in the annulus by the effect of the falling liquid slurry may create a measurable reduction in the absorber resistance.

Figure 8:
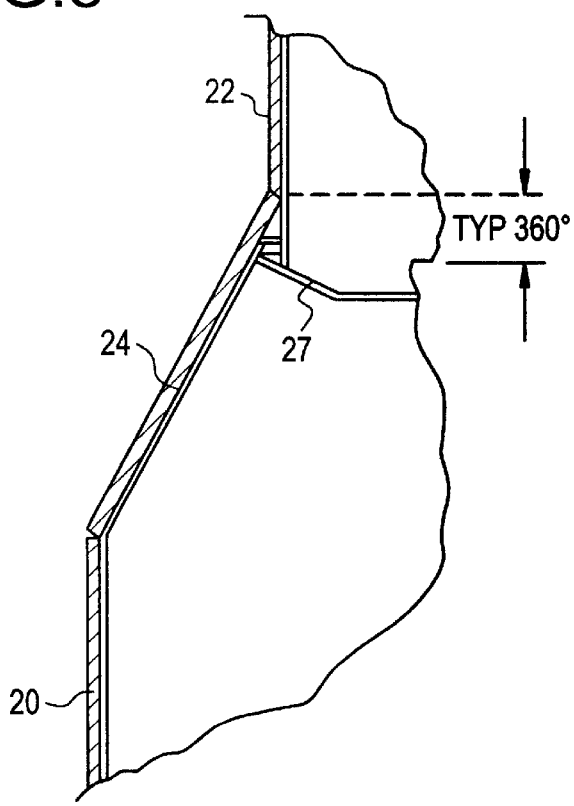
FIG. 8 is a partial sectional view showing the transition structure of an absorber tower according to the present invention.

FIG. 8 illustrates one embodiment of the transition structure 24 which may include an upper ledge or skirt 27 which extends 360° around the lower open end of absorption section 22.

Figure 9:
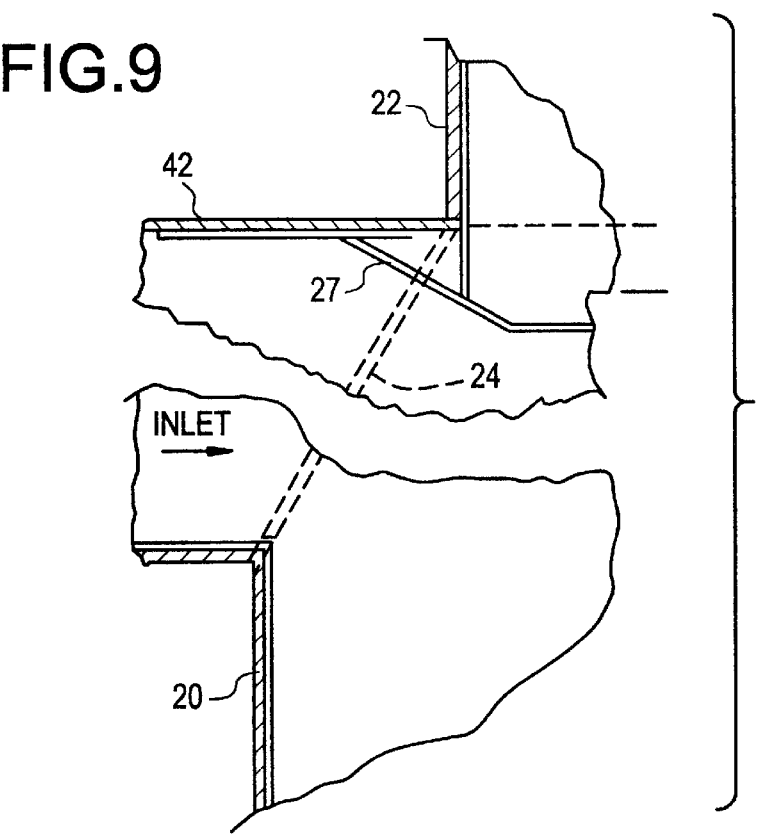
FIG. 9 is a view similar to FIG. 8 of the transition structure illustrating the inlet assembly of the present invention.

FIG. 9 is a circumferentially offset position compared to FIG. 8 and illustrates inlet housing 42. Ledge 27 extends across inlet housing 42 in the embodiment of FIG. 9.

While specific embodiments of the invention have been shown and described in detail to illustrate the application of the principles of the invention, it will be understood that the invention may be embodied otherwise without departing from such principles.

What is claimed is:

1. In an absorber tower having a lower large diameter tank section for containing an absorbing liquid slurry rising to a liquid slurry level in the tank section, an upper smaller diameter absorber section where liquid scrubbing agent in the form of recycled liquid slurry and fresh liquid slurry is mingled with flue gas from which impurities are to be absorbed, a low pressure drop inlet assembly comprising:

a conical transition structure extending at an angle between the lower large diameter tank section and the upper smaller diameter absorber section which forms a liquid tight and gas tight pathway for gases and liquids between the lower large diameter tank section and the upper smaller diameter absorber section, the upper smaller diameter absorber section limiting an area where the liquid slurry falls from the upper smaller diameter absorber section to a center of the lower large diameter tank section, leaving an annular transition area around the upper smaller diameter absorber section void of the falling liquid slurry and available for gas flow to provide the flue gas with a path of low resistance so that the flue gas spreads around the annular transition area and is evenly distributed around the upper smaller diameter absorber section; and an inlet housing connected to and communicating with the conical transition structure for inlet of flue gas into the absorber tower via the conical transition structure between the lower large diameter tank section and the upper smaller diameter absorber section, the inlet housing having a top plate which extends from about 1 to about 10 feet beyond a lower plate of the inlet housing to provide protection to the inlet housing from backflow of liquid slurry into the inlet housing.

2. The absorber tower according to claim 1, wherein the conical transition structure extends at an angle of about 15 to 90°.

3. The absorber tower according to claim 1 wherein the inlet housing has a height X which is substantially equal to a vertical height of the conical transition structure and a width Y which extends partly around a circumference of the conical transition structure.

4. The absorber tower according to claim 3 wherein the width extends up to about 90° to about 180° around the circumference of the conical transition structure.

5. The absorber tower according to claim 1, further comprising spray means in the absorber section for spraying slurry partly recycled from the tank section, at least one perforated tray in the absorber section and at least one mist eliminator above the spray means in the absorber section.

6. The absorber tower according to claim 1, further comprising a ledge extending around a lower opening of the absorber section substantially at an upper end of the conical transition structure.

7. The absorber tower according to claim 1, further comprising spray means in the absorber section for spraying an alkali liquid partly recycled from the tank section.

* * * * *